United States Patent Office 2,772,167
Patented Nov. 27, 1956

2,772,167
DIETARY SUPPLEMENT

Horace W. Diamond, Flossmoor, Ill., and Robert L. Frank, Lake Geneva, Wis., assignors to Morton Salt Company, Chicago, Ill., a corporation of Illinois No Drawing. Application October 12, 1953,
Serial No. 385,686

3 Claims. (Cl. 99—2)

This invention relates to an iodine source material particularly adapted for use as a food supplement in correcting dietary iodine deficiencies.

It has long been known that iodine was capable of reducing enlarged goiters and with this discovery it was established that iodine is a beneficial if not an essential element in the diet. As the science of endocrinology developed, it became definitely established that thyroid gland (goiter) enlargement was directly due to a lack of iodine. The physiological activity of the thyroid hormone is now recognized as being due to the thyroxine content and, since thyroxine is an amino acid containing a high percentage of iodine, due equally to the iodine content. Accordingly, in areas where the soil and water, and consequently the plant and animal foodstuffs produced in that area, are all deficient in iodine, insufficient thyroxine will be produced by the thyroid gland. As a result, various iodine deficiency diseases and disorders such as endemic goiter may occur in both animals and human beings. As a lesser known disorder there is a condition in which the metabolic rate is lowered as a result of thyroid inactivity. This low metabolism inhibits the body in burning the food consumed so that full value of the food energy contained therein is not available with tiredness and sluggishness being the result.

To correct these various conditions described above iodine has been provided in many forms for use as a food supplement. In the form of the more common inorganic iodine-containing compounds these iodides have proved to be readily available to the body but not readily retained. In seeking to increase the degree of body retentivity various organic iodides have been developed which are quite satisfactory but which possess the disadvantage of being relatively expensive. It is now the object of this invention to provide an iodine source material that is vastly superior to any of the iodine-containing compositions heretofore employed in foods and feeds.

It is a further object of this invention to provide a physiologically superior iodine source which is less expensive than those employed commercially at present.

These and other related objects are achieved in this invention wherein it has been discovered that iodine in the form of cuprous iodide possesses superb properties of availability for assimilation, retentivity by the body, and non-toxicity.

In testing availability for assimilation cuprous iodide was compared with several of various iodine-containing compounds possessing a known variety of physical and chemical properties. For purposes of comparison potassium iodide, thymol iodide, 3,5-di-iodosalicyclic acid, and Oridine were employed in the testing. Potassium iodide has an established solubility superiority for iodine-containing compounds. Thymol iodide was chosen because of its extensive use in block salt for which use an iodide must be quite insoluble. As a less-expensive, similarly insoluble material 3,5-di-iodosalicyclic acid was included, and Oridine, which is a mixture of iodinated fatty acids, was tested as an individual standard of comparison because of its wide acceptance by physicians treating iodine deficiency disorders. Availability is, of course, of fundamental concern inasmuch as the degree of assimilation of ingested foodstuffs material will be proportional to the nutritional benefit conveyed by it. Accordingly, availability of the iodine to the thyroid gland for the production of thyroxine was determined by a method based on the actual weight of the thyroid gland. According to this method young albino rats were reared on an iodine-deficient diet to which known amounts of an iodide to be tested were added. If the rat did not absorb and retain the minimum amount of iodine necessary to produce normal quantities of the hormone, the thyroid gland would become enlarged as a natural response to the lack of iodine.

Since it has been reported by Remington and Remington in the Journal of Nutrition, 15, 539 (1938), that 265 micrograms of iodine in the form of potassium iodide is sufficient to protect a growing rat from iodine deficiency, availability tests were conducted as follows:

Group A: Control group reared on a low iodine test diet.
Group B: A diet consisting of 265 micrograms of iodine as potassium iodide per kilogram of test diet.
Group C: Diet consisting of 265 micrograms of iodine as cuprous iodide per kilogram of test diet.
Group D: Diet consisting of 265 micrograms of iodine as thymol iodide per kilogram of test diet.
Group E: Diet consisting of 265 micrograms of iodine as 3,5-di-iodosalicyclic acid per kilogram of test diet.

The animals used in the test were housed in separate cages and fed only the prescribed diet and distilled water. At the end of five weeks the thyroid glands were carefully dissected and weighed wet. A normal thyroid gland should weigh about ten milligrams per 100 grams of body weight. The results of these initial availability tests are found in Table I.

TABLE I

[Animals given 10 grams of food daily for five weeks. Iodides were dissolved and sprayed into the food in a quantitative manner.]

| Series No. | No. of Animals in group | Average Weight of Gland in milligrams/100 grams of body weight |
|---|---|---|
| A (Control, Test Diet Alone) | 5 | 15.4 |
| B (265 micrograms of $I_2$ from potassium iodide/kilo of Test Diet) | 10 | 10.0 |
| C (265 micrograms of $I_2$ from cuprous iodide/kilo of Test Diet) | 10 | 9.8 |
| D (265 micrograms of $I_2$ from thymol iodide/kilo of Test Diet) | 10 | 12.5 |
| E (265 micrograms of $I_2$ from 3,5-diiodosalicyclic acid/kilo of Test Diet) | 10 | 11.9 |

From Table I it can be seen that iodine from cuprous iodide is as biologically available to the animal as is potassium iodide and is far more physiologically available than is the presently employed thymol iodide.

Specifically, the animals in this group were given only 10 grams of food per day and kept on the diet for five weeks. The potassium iodide was dissolved in water, cuprous iodide in ammonium hydroxide, thymol iodide in ethyl alcohol, and 3,5-diiodosalicyclic acid in acetone. These solutions were sprayed upon the test diet by means of a fine atomizer and then thoroughly mixed in to assure even distribution within the food.

With the first tests indicating superiority for cuprous iodide with relation to availability, a second series of experiments were carried out to further test the cuprous iodide at three different levels. As shown in the following Table II these levels were respectively 265, 200, and 150 micrograms of iodine per kilogram of diet. Since a rat eats about 10 grams of food daily these concentrations were equivalent to 2.65, 2.00 and 1.50 micrograms of iodide per day.

TABLE II

[Animals allowed to eat as much as they wanted for six weeks. Iodines were not dissolved but added directly.]

| Series No. | No. of Animals in Group | Average Weight of Gland in milligrams per 100 grams of body weight |
|---|---|---|
| F (Control, Test Diet Alone) | 5 | 18.1 |
| $G_1$ (265 micrograms of $I_2$ from cuprous iodide per kilo of Test Diet) | 10 | 7.3 |
| $G_2$ (200 micrograms of $I_2$ from $CuI_2$ per kilo of Test Diet) | 10 | 8.5 |
| $G_3$ (150 micrograms of $I_2$ from $CuI_2$ per kilo of Test Diet) | 9 | 9.2 |
| H (265 micrograms of $I_2$ from Oridine per kilo of Test Diet) | 10 | 7.3 |

The Table II experiment continued for six weeks during which time the animals were allowed to eat as much as they wished. For that reason they received somewhat more total iodine than in the previous test but they also grew larger and consequently the weight of thyroid per body weight is the ratio again used for purposes of comparison. The iodides employed here were not dissolved but were added directly to the test diet. Again it was found that cuprous iodide possessed a special propensity in protecting against iodine deficiency disorder and as more iodine was made available to the animals the smaller the thyroid gland became. It is also to be noted that in Table II Oridine, which consists of calcium salts of iodized fatty acids, was also fed to a group of rats at a level of 265 micrograms of iodine per kilogram of test diet. The use of this material extended the availability comparisons inasmuch as Oridine is commonly prescribed by physicians for iodine deficiency disorders.

In determining further suitability of cuprous iodide retentivity tests were run in which the same four materials were compared with cuprous iodide. In these determinations, results of which are tabulated in Table III, the animals were fed a small amount of iodine twice a week. The weekly intake was reduced from 18.5 micrograms of iodine to 5.25 micrograms, which is a subminimal dose rather than an optimal one, so that a slight goitrous condition was produced. This condition was specially induced in order to make the method more sensitive in separating the retentivity of the iodides tested. The animals were kept on this diet for eight weeks and were given 10 grams of food containing 2.625 micrograms of iodine twice a week to produce a total of 5.25 micrograms stipulated above. With this test diet they were allowed to eat freely of as much iodine-free food as they desired during the period.

TABLE III

*Retention of iodine from various iodides*

[Animals given 2.625 micrograms bi-weekly for eight weeks.]

| Series No. | No. of Animals | Average weight of Thyroid in milligrams per 100 grams of body weight |
|---|---|---|
| I (Potassium Iodide) | 10 | 12.18 |
| J (Cuprous Iodide) | 10 | 9.62 |
| K (Thymol Iodide) | 9 | 14.34 |
| L (3,5-di-iodosalicylic Acid) | 10 | 13.53 |
| M (Oridine) | 10 | 14.46 |
| N (Control, I: Free Diet) | 9 | 40.86 |

With the aforementioned 10 milligrams of thyroid weight per 100 grams of body weight constituting the basis for optimum results it can be seen that cuprous iodide was best retained by the thyroid with no attendant increase in size.

This difference, because of its sizeable effect, is wholly unexpected but can possibly be attributed to the fact that cuprous iodide is retained in the system for extended periods and has an optimum solubility in gastric juices. The organic iodides must be so insoluble that they tend to pass through the digestive system undissolved whereas potassium iodide as a highly soluble material is absorbed by the system and lost before it can be effectively utilized.

Because of the fundamental question concerning potential toxicity of foodstuffs ingredients, both acute and chronic toxicity tests were conducted on cuprous iodide after its superiority in availability and body retentivity had been established. In the acute toxicity tests animals were given cuprous iodide in a large dose mixed with meat. In the following Table IV the amount of iodine is expressed in milligrams per kilogram of body weight.

TABLE IV

| No. of Animals | Dose, mg./kg. | Effects |
|---|---|---|
| 3 | 500 | No ill effects. |
| 2 | 1,000 | Diarrhea; not lethal; rats normal in two days. |
| 1 | 2,000 | Diarrhea; not lethal; rats recovered. |

From these results it can be seen that cuprous iodide is neither moderately nor slightly toxic according to Hodge and Sterner toxicity ratings. The animals survived 30,000 times the daily dose and accordingly cuprous iodide must be regarded as non-toxic especially in view of the fact that such a small amount (0.0000039 gram per day) is required to maintain normal thyroid activity.

Chronic toxicity tests are by definition based on a repeated small amount of chemical given over a considerable period of time and accordingly young albino rates were kept for five months (which period is about one-fourth of their total life span) on the following diets:

*a.* 1.0 gram of cuprous iodide per 1,000 grams of normal diet.

*b.* 0.1 gram of cuprous iodide per 1,000 grams of normal diet.

Those animals receiving 1 gram of iodide per 1,000 grams of food were receiving about 20 times the daily minimum dose and the animals on 0.1 gram diet were obtaining about twice the amount of iodine needed. In both situations the animals gained weight normally and autopsies showed no liver, kidney or intestinal abnormalities. The animals were in excellent health at the conclusion of the tests.

Although cuprous iodide can be employed in many ways as a dietary constituent, it is specially contemplated that it would be useful in solid form in a mixture with common table salt or any other similar compositions of sodium chloride such as block salt. Because of the similarity between dietary deficiencies in animals generally and in humans it is readily appreciated that the use of cuprous iodide has particular application in the production of iodized table salt. In any of these applications its unexpected superiority in availability and body retentivity make cuprous iodide of special value in either general nutrition or in a remedial role.

Having thus described our invention what we claim is:

1. An iodine-source material adapted for use as an animal feed supplement comprising cuprous iodide and sodium chloride.

2. A molded sodium chloride form containing an iodine supplement which comprises a mixture of sodium chloride and cuprous iodide.

3. An animal feed containing, as the essential iodine-supplying composition, cuprous iodide.

References Cited in the file of this patent

UNITED STATES PATENTS

| | | |
|---|---|---|
| 2,489,758 | Dunn | Nov. 29, 1949 |
| 2,603,566 | Diamond | July 15, 1952 |